(12) United States Patent
Lau et al.

(10) Patent No.: US 6,604,197 B1
(45) Date of Patent: Aug. 5, 2003

(54) SECURE FLEXIBLE ELECTRONIC SUBMISSION ACCEPTANCE SYSTEM

(75) Inventors: Terence Chun-Yat Lau, North York (CA); Lev Mirlas, Thronhill (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/204,778

(22) Filed: Dec. 3, 1998

(30) Foreign Application Priority Data

May 14, 1998 (CA) .......................................... 2237678

(51) Int. Cl.⁷ ................................................ H04L 9/00
(52) U.S. Cl. ..................... 713/151; 713/181; 713/178; 713/165
(58) Field of Search .................. 713/177–178, 713/164–165, 181, 151; 380/243

(56) References Cited

U.S. PATENT DOCUMENTS

| | | | | |
|---|---|---|---|---|
| 4,458,109 A | * | 7/1984 | Mueller-Schloer | 380/30 |
| 5,136,646 A | * | 8/1992 | Haber et al. | 713/178 |
| 5,182,705 A | * | 1/1993 | Barr et al. | 705/11 |
| 5,247,647 A | * | 9/1993 | Brown et al. | 714/1 |
| 5,266,942 A | * | 11/1993 | Stoller | 340/5.74 |
| 5,469,576 A | * | 11/1995 | Dauerer et al. | 713/200 |
| 5,615,268 A | | 3/1997 | Bisbee et al. | 380/25 |
| 5,721,904 A | * | 2/1998 | Ito et al. | 707/8 |
| 5,931,917 A | * | 8/1999 | Nguyen et al. | 709/250 |
| 5,970,143 A | * | 10/1999 | Schneier et al. | 713/181 |
| 5,987,134 A | * | 11/1999 | Shin et al. | 713/159 |
| 5,987,611 A | * | 11/1999 | Freund | 713/201 |
| 6,115,735 A | * | 9/2000 | Saito | 713/178 |
| 6,223,286 B1 | * | 4/2001 | Hashimoto | 713/178 |

OTHER PUBLICATIONS

Bruce Schneier, applied cryptography, second edition, 1996, p. 38.*

* cited by examiner

Primary Examiner—Gilberto Barron
Assistant Examiner—Kambiz Zand
(74) Attorney, Agent, or Firm—A. Bruce Clay; Marcia L. Doubet (57) ABSTRACT

In an electronic filing system over a computer network, a central server sets the requirements for making submissions. These requirements include a time limit after the expiry of which, submissions will no longer be accepted. A gateway server polls the central server for the submission requirements, and establishes a directory in its own file system to which all potential submitters have write access until expiry of the time limit. On completion of its submission, a submitter generates evidence of the complete submission. The evidence can be in the form of a digitally signed message digest. The submitter may encrypt the evidence using the gateway server's public encryption key and then forwards the evidence to the gateway server. If the evidence is filed before expiry of the time limit, the gateway server permits the evidence to be written to the directory established for the submission requirements. Once the submitter has successfully filed its evidence, it can forward the complete submission to the gateway server. When the gateway server receives the complete submission, if encrypted, it decrypts the evidence, checks the submitter's digital signature on the evidence, and it then compares the complete submission with the evidence. If the evidence is a message digest, the gateway server computes a message digest of the complete submission. If the two digests are identical, then it is clear that the submission was completed when the evidence was filed, before expiry of the deadline, and the gateway server can then forward the submission on to the central server.

18 Claims, 8 Drawing Sheets

SECURE FLEXIBLE ELECTRONIC SUBMISSION ACCEPTANCE SYSTEM

FIELD OF THE INVENTION

This invention is in the area of electronic information transmission, and provides a time-sensitive document submission system in which the submitter receives immediate verification whether the submission has been made in time.

BACKGROUND OF THE INVENTION

As the Internet becomes a more reliable and accepted transmission medium, it can be used for all types of information interchange.

For example, U.S. Pat. No. 5,694,546—Reisman describes a system for mass distribution by electronic transmission of information, such as periodicals. Using a current manifest, the server automates transmission of current issues and updates of the periodical information, and verifies with the customer that the transmission has been received in its entirety. Updating the customer's records can be totally automatic, or, as discussed in a preferred embodiment example in the patent, the customer's system clock can be monitored, and the customer alerted to the arrival of an update release date so that the customer can confirm that the system should seek and fetch the scheduled update, if available.

Another use of electronic transmission is for filing information to meet time deadlines. It is this use to which the present invention is directed.

An example of time-sensitive filing is commercial tenders. An invitation to tender electronically is usually not different from more traditional formats; a non-extendible submission deadline is set for receipt of sealed bids, and only those tenders filed by the deadline are considered.

Other examples of time-sensitive information submissions include:

applications for enrollment, submission of educational assignments and examinations, comments in response to requests for proposals, and purchase orders that must be received before expiry of a fiscal period.

By using electronic transmission to send information that is time-sensitive (as well as non-time sensitive information), the user is able to transmit, with certainty, the required information over a great distance in a short time, usually not exceeding a few hours. Compression technology permits lengthy documents to be sent. Encryption technology provides security where the information transmitted electronically is commercially sensitive or confidential.

Where the filing of a submission must meet a time limit or deadline, the receiving server cannot rely on the submitter's clock for controlling the submission gate because it is impossible to ensure the accuracy of the sender's clock, and, in a competitive situation, it is impossible to synchronize the clocks of all senders to ensure fairness.

However, the submitter usually wants to know as soon as possible whether a submission has met the time limit and been accepted for filing. There are a number of alternate techniques, known in the art, to try to return this type of information to the sender.

One technique is to enable the submitting application to try to check the date on-the-fly, while the submitter is still connected. However, this can be an expensive solution, particularly if database access is involved.

Another solution is to have the receiving processor check the submission at "submission time" to determine whether the document is on time, and to return a message to the submitter as soon as the check is complete. Implementing this solution requires that the processor receiving submissions filed to meet a deadline, have an active agent to respond to each submission at the time that document arrives. It is difficult to implement this technique universally because:

1. Some environments do not readily provide an active agent to immediately process documents on arrival; and
2. Some servers may not have the processing capability required for the actions of active agents, particularly where an invitation to tender is available to a wide constituency. As the deadline drew near, the volume of documents arriving could be huge. A scheme that requires active processing and checking of the arriving documents around that time would require corresponding "huge" performance from the processor. If the processor was able to process and respond on only some submissions, then the system would be unfair to submitters of those submissions that were missed by the processor.

If, in the above scheme, the receiving processor merely received and time stamped all documents for later checking for compliance with the deadline, the processing performance problem would be addressed, but no immediate feedback (deadline verification) would be provided to the submitter.

Another technique is to disable the receiving mechanism when the deadline arrives. However, this is extremely complex to implement because at the deadline time, there could be a huge backlog of files at different states and at different queues inside the system; some files being received, some awaiting "connection open", etc. The system may not have a clean way of allowing the receiving application to chop off a queue. If disabling the receiving mechanism must wait until all queues are clear, the waiting time could be very unpredictable as files kept coming in to re-fill the queues. The deadline would lose its definition, and would not be the same for all submissions.

Another alternative is to require a positive two-way handshake process between sender and receiver before the submitting program begins to file the submission, such as described in the above-referenced U.S. Pat. No. 5,694,546. As described in the patent, the protocol used for the handshaking is relatively complex; it identifies the customer's transporter client system to the remote server (that will issue the periodical information) by product ID and user ID, and a password or other authentication code for the transporter log file. This technique also requires an active agent on the receiver side, so that the performance problems discussed above associated with active agents at deadline time could result in added problems if processor performance prevented establishing the handshake, so that the submitting program could not make the submission at all.

Previously filed Canadian Patent Application No. 2,228,331, titled "A Token-Based Deadline Enforcement System for Electronic Document Submission", now U.S. Pat. No. 6,182,124, which is commonly assigned, provides a type of solution that does not depend on active agents, such as discussed above. Instead, a submission requirements centre collects information on submission requirements (eg., deadlines for submitting bids in response to commercial tenders), from the processing environments that generate the requirements. A gateway to a network of potential submitters polls the information collected in the submission requirements centre, and generates tokens corresponding to current submission time limits. These tokens are available to all potential submitters until expiry of the corresponding time limit for the submission. On receiving a request for electronic submission from a submitting program, the gateway searches its records for the token corresponding to the submission type. If the token is located, it is returned to the submitting program for packaging with the submission. If the token is not located, an electronic message, such as an error flag, is returned to the submitting program, and the submitter knows immediately that the submission did not meet the deadline. When a submission packaged with a valid token is received at the gateway, it can be routed directly to the processing environment that generated the submission requirement. The valid token provides an on-time validity check; the receiving processing environment does not have to check the submission as it arrives to ensure that it has been filed on tire, but can delay processing to a convenient time, to verify compliance with substantive requirements for filing the submission. Thus, no processing is required for the documents when they arrive, yet the system provides the submitter with immediate feedback whether the submission has been accepted for filing within the deadline. The possible performance problems in trying to process "time of filing" for a large number of submissions filed virtually simultaneously as the submission deadline draws near, are avoided, and the submitter is saved network access costs in waiting for a verification of filing to be returned.

SUMMARY OF THE INVENTION

The present invention addresses the prior art issues (alleviating electronic transmission delays that could cause a submission to miss a deadline, and providing a submitter with rapid feedback whether a submission has been accepted for filing or not) in a different way.

The present invention provides a scheme to allow a submitter to "commit and lock-in" a submission completed before expiry of a deadline, in a very efficient manner.

The present invention provides many of the same advantages as those discussed in relation to the invention of our earlier filed token-based submission system. However, the present invention is particularly useful in the case of large electronic submission documents, that could be subject to delay in transmission, although it is clearly also useful for submitting smaller submissions as well. As long as the submitter is able to submit, before expiry of the submission deadline, a small token or digest, as discussed in detail below, the system guarantees that the full submission will eventually be accepted, and that the eventual full submission is identical to the submission from which evidence was presented.

Therefore, the present invention provides a method for enforcing time limits in a gateway server in an electronic filing system in which an electronic message containing evidence of submission completion, such as a message digest, is received from a submitting program. A write-enabled directory for storing the evidence is identified, and the evidence is stored in it. If no directory is identified, a first submission rejection indication is returned to the submitting program. On receipt of the complete submission, the complete submission is matched with the evidence filed in the directory, preferably by computing a message digest of the complete submission and comparing it to the evidence on file. If the complete submission does not match, a second submission rejection indication is returned to the submitting program. Preferably, write access to the directory is removed once the submission time limit expires.

The invention also provides a gateway mechanism for enforcing time limits for filing electronic submissions in a network. The mechanism enables a server in the gateway mechanism to receive information related to a submission time limit from a submission processing environment and generate a storage directory in the server's file system with write access for all potential submitters within the submission time limit. The mechanism is enabled to (i) receive an electronic message containing evidence of submission completion from a submitter, (ii) verify write access to the storage directory, and (iii) if the write access is verified, write the evidence to the storage directory, or else return an error indication to the submitter.

The mechanism is also enabled to remove the write access to the storage directory on expiry of the submission time limit, and match a complete submission received from the submitter with the evidence written to the storage directory, or else return an error indication to the submitter. Preferably, the mechanism's means to match a complete submission with the evidence written to the storage directory include decrypting the evidence (if received in encrypted form) and verifying the submitter's digital signature, and transforming the complete submission to the same format as the evidence (for example, message digest), to compare that the transformed versions are identical.

The invention also provides a computer program product comprising a computer usable medium having computer readable program code means embodied therein for enforcing time limits in an electronic filing system.

BRIEF DESCRIPTION OF THE DRAWINGS

Embodiments of the invention will now be described in detail in association with the accompanying drawings, in which.

DETAILED DESCRIPTION OF THE PREFERRED EMBODIMENTS

Figure 1A:
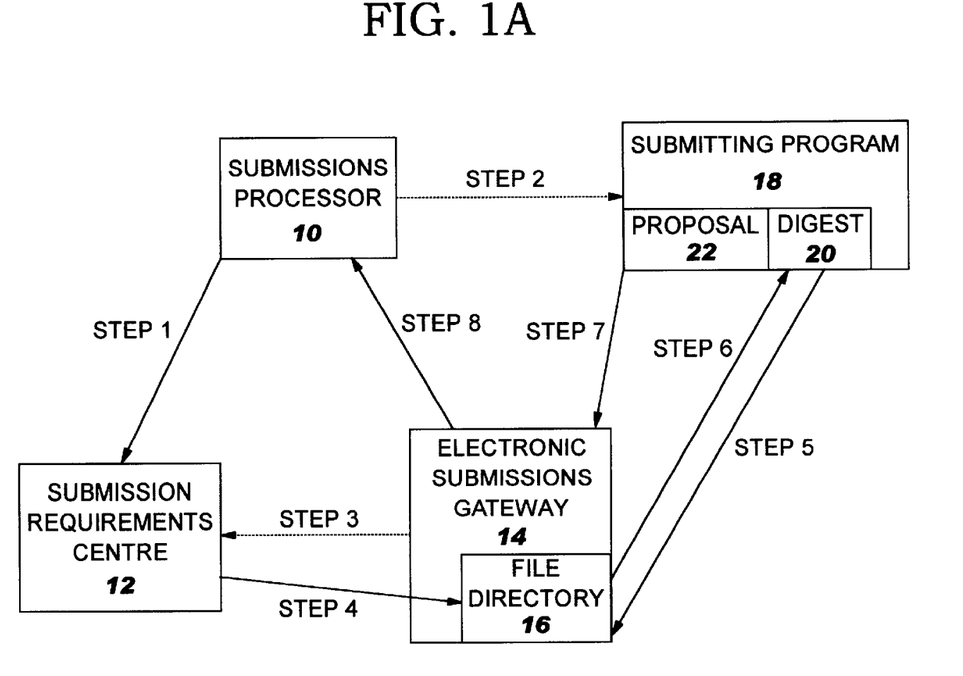
FIGS. 1A to 1C are schematic representations of a flexible electronic submission acceptance system, according to preferred embodiments of the invention.
Figure 1B:
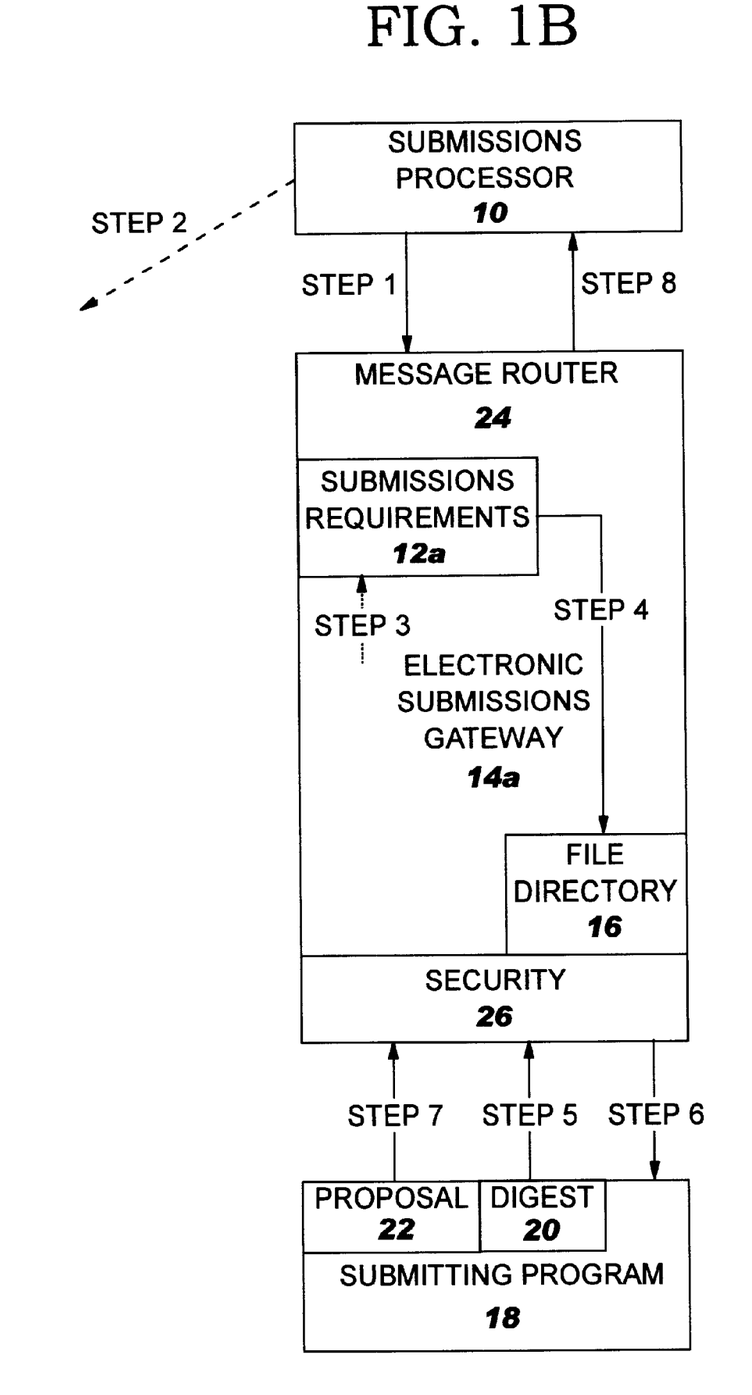
Figure 1C:
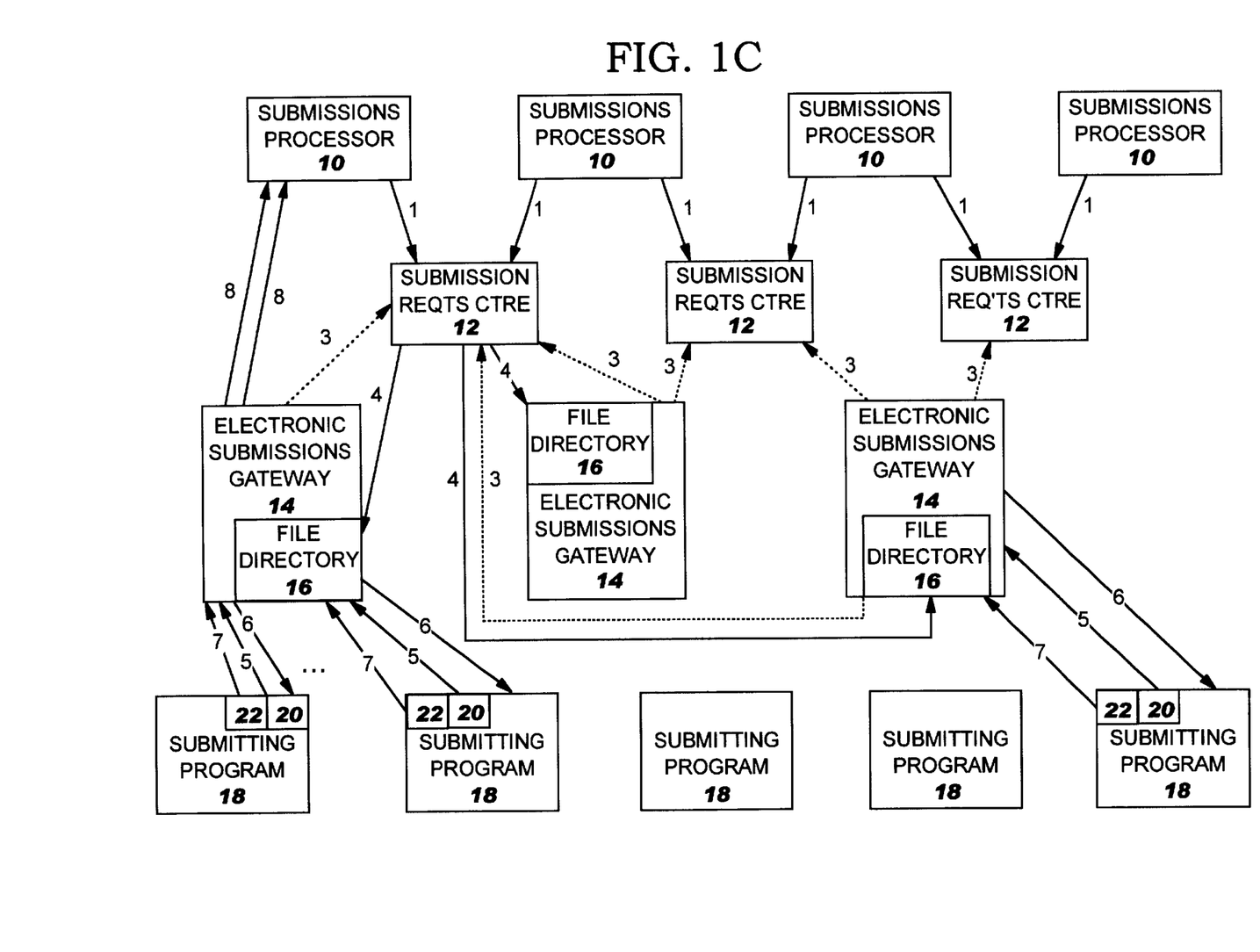

A flexible electronic submission acceptance system, according to the invention, comprises the basic components illustrated schematically in FIG. 1. FIGS. 1A and 1B illustrate alternate simplified systems with a single representation of each component discussed in relation to the system; FIG. 1C illustrates a larger and more complex system of the same type.

Referring first to FIG. 1A, a Submissions Processor 10 is an entity that creates and generates the requirements for a submission, assigns the submission type and sets the deadline for receiving submissions intended to meet the requirements. As will become more apparent in relation to FIG. 1C, the Submissions Processor 10 that creates the requirements for a particular submission type, is also the entity that receives the submissions filed to respond to the requirements, and processes those submissions, assuming that the submissions that reach it have been filed by the deadline.

Continuing with FIG. 1A, the Submission Requirements Centre 12 is a server that collects information about all upcoming current submission requirements, the corresponding deadlines and the expected submission type. Generally, this information is collected at the Submissions Requirements Centre 12 when the Submissions Processor 10 generates a new set of requirements and transmits the set to the Submission Requirements Centre 12 via step 1. At the same time, the existence of the requirements (such as an invitation to tender) is publicised to the prospective submitters via step 2.

The Submissions Requirements Centre 12 makes the submission requirements information available to another component called the Electronic Submissions Gateway 14. This can happen when the Gateway 14 polls (step 3) the Submission Requirements Centre 12 for new submissions of a specific type. In response, the Centre 12 transmits (step 4) the new set of requirements for storage in File Dictionary 16.

The Electronic Submissions Gateway 14 is the server that interfaces directly with submitting programs 18 used by end users for filing their submissions 22 in step 7. After the Gateway 14 determines that evidence of a submission arrived (step 5, 6) before the corresponding deadline, and verifying the digest 20, it routes in step 8 the submission 22 to the appropriate Submissions Processor 10.

FIG. 1B schematically illustrates an embodiment of the invention which could be implemented for a commercial tendering system for a large organisation. In this embodiment, the Submissions Processor 10 is a master buyer server operating under a Microsoft Windows NT operating system to collect purchase requisitions from inside the organisation. The Electronics Submission Gateway 14a is a document information gateway operating under an IBM RS/6000® operating system. In this embodiment, the Gateway 14a, itself, is the repository 16 of information about current submission requirements from the Submission Processor 10. The Gateway 14a has a Submission Requirements component 12a that interfaces directly with the Submissions Processor 10 to collect this information, and to make it available internally (step 4), proposals 22, to other components of the Gateway 14a. The Submission Requirements component 12a also includes a tender bulletin board, preferably on a secure website, to notify external parties (i.e., potential suppliers) of calls for tender. The potential suppliers make bid submissions to the system via submitting programs 18 operating on PC operating systems with network/Internet access, such as IBM OS/2® Warp, Microsoft Windows® 95, etc.

Communications between the master buyer server/ Submissions Processor 10 and Gateway 14a, or other gateways using step 7, is handled by an OS/2 Message Router 24 located in the Gateway 14a. The Submissions Processor 10 automatically wraps outgoing messages (step 1) and unwraps (step 8) incoming messages in order to ensure data integrity. Similarly, the Message Router 24 automatically wraps (step 8) and unwraps (step 1) messages going to and from the Submissions Processor 10. Messages within the Gateway environment, for example from the Message Router 24 to the Submission Requirements component 12a (step 3), or between the Submission Requirements component 12a and other components in the Gateway 14a, are not wrapped.

The Gateway 14a has a firewall that protects it from the external network. Communications with suppliers are handled by a security module 26 which automatically builds a secure structure before forwarding a message (step 6) to a supplier over the network, and unpacks the secure structures it receives from the network, such as digest 20 in step 5, in order to forward plain messages to other components in the Gateway 14a to process. The secure structure packages the evidence in one message, and the submission in another message. As discussed below, both the submitting program 18 and Gateway 14 may use message digest 20 in step 5, or a similar technology, to lock in a proposed submission 22 in step 7. Encryption and digital signature technologies may also be used to assure integrity, privacy, authentication, and non-repudiation of messages and submissions over the open network.

As FIG. 1C shows, the Submission Requirements Centre 12 can collect information on new requirements (step 1) for multiple Submissions Processors 10, and can make those requirements available, in turn, to multiple Submissions Gateways 14. Similarly, each Electronic Submissions Gateway 14 can be responsible to poll (step3) multiple Submission Requirements Centres 12, provided that each Gateway 14 also has direct access, step 8 (for the purpose of directing qualifying submissions, steps 5, 6 and 7), to all Submissions Processors 10 creating requirements collected by the Submission Requirements Centres 12.

Figure 2A:
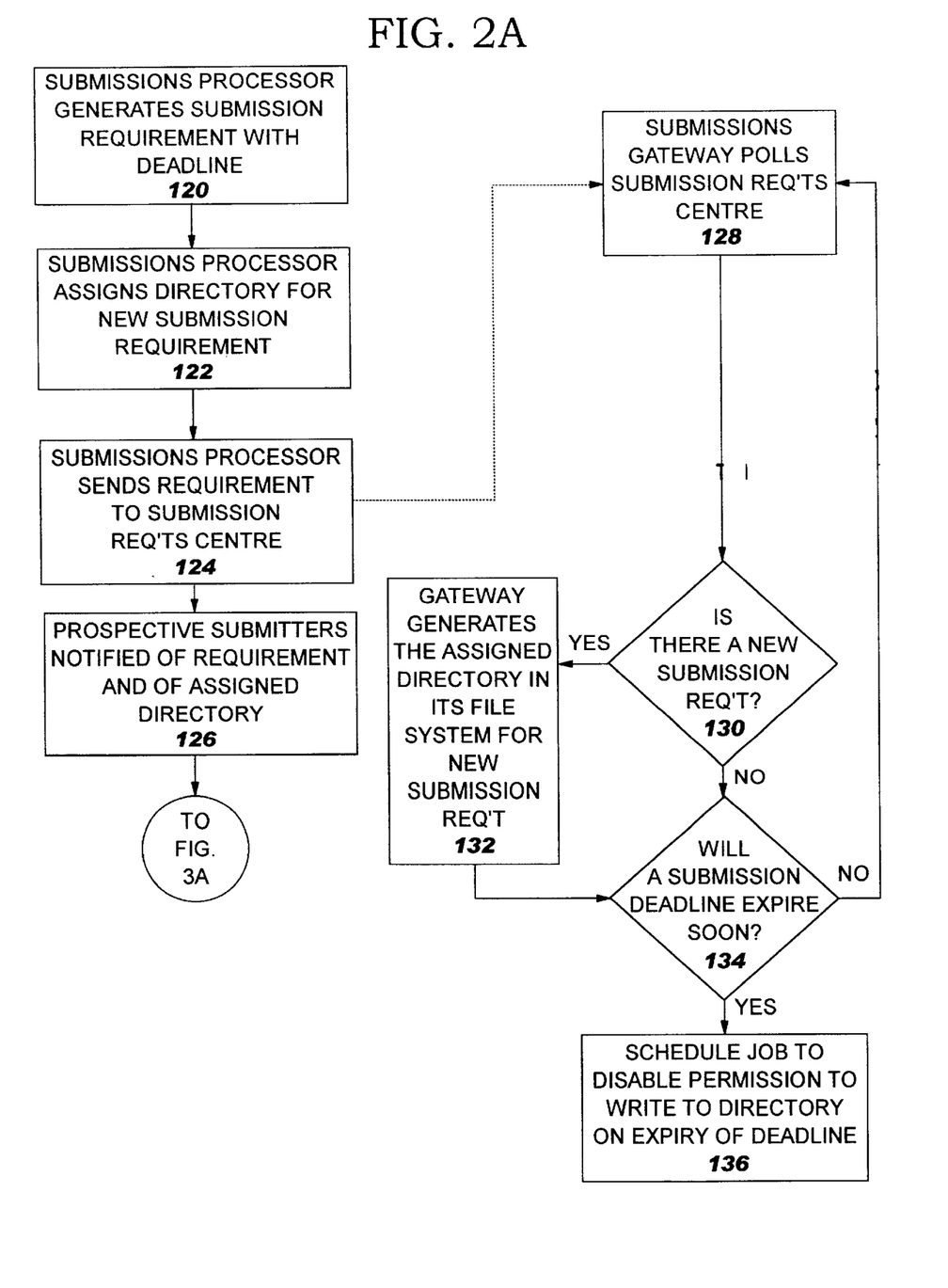
FIG. 2A is a flow diagram setting forth the steps for creating, and subsequently disabling, a directory in the Gateway mechanism for receiving "evidence" of submission completion in a Windows NT® environment, according to one aspect of the invention.
Figure 2B:
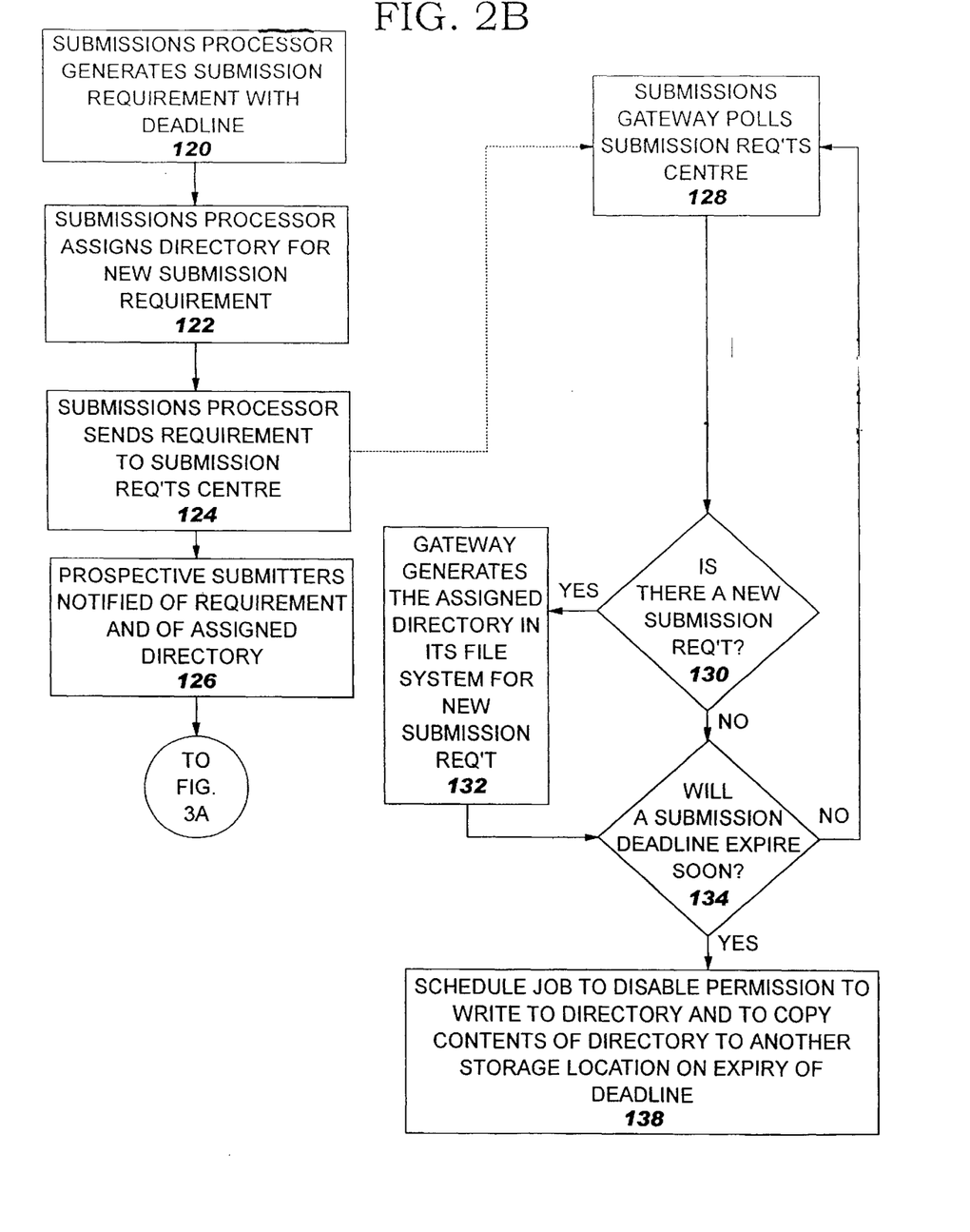
FIG. 2B is a flow diagram, similar to FIG. 2A, setting forth a special routine for disabling the submitters' ability to drop off evidence, particularly applicable to UNIX®-based systems.

Submission requirements (deadlines, etc.) are created and their submission deadlines managed, according to preferred embodiments of the invention, following the steps set forth in the flow diagrams of FIGS. 2A and 2B.

In FIG. 2A, a Submissions Processor generates a submission requirement and sets the deadline for accepting submissions that respond (block 120). Submission requirements generated by the Submissions Processor can include altering existing deadlines (shortening or extending them) and withdrawing existing submission requirements, as well as creating entirely new submission requirements. In the case of a new submission requirement, the Submission Processor assigns a directory for the requirement (block 122).

The Submissions Processor then sends the requirement to the Submissions Requirements Centre (block 124), and affected parties are notified of the requirement and of the assigned directory (block 126). In the case of the posting of a new submission requirement at the Submission Requirements Centre, the notification would invite prospective submitters to send in submissions. The type of notification used will depend upon the type of submissions sought. In the case of a commercial tender, the notification could include advertising in print media and on websites. The response of a submitting party, its submission of a proposal intended to meet the requirements, is set out in FIGS. 3 and 4.

The Electronic Submissions Gateway polls the Submission Requirements Centre to check for new submission requirements and for changes to existing requirements created by Submissions Processors (block 128). Unless the Gateway has access to the notification of a new submission requirements sent out by the Processor, the Gateway won't know when a new submission requirement has become available. In that case, the Gateway would poll the Submission Requirements Centre constantly or at frequent intervals, to ensure that a new requirement is not missed for very long.

In response to determining that a new submission requirement has been created (block 130), the Gateway creates the assigned directory in its file system (block 132) specific to that submission requirement. The file directory is used by the Gateway in verifying that submissions filed to meet the new requirements are received before expiry of the submission deadline, according to FIGS. 3 and 4.

The effect of deadline expiry must be simultaneous for all submitters. By continuously polling the Submission Requirements Centre, the Gateway also checks for deadlines on existing submission requirements that are about to expire or that have been withdrawn by the Submissions Processor (block 134). Some operating systems, such as Windows NT, allow the system administrator to grant access to users to add files to a directory, but not to erase them. In such a system, when the Gateway discovers the impending expiry of a requirements deadline, it simply schedules a future job or process to disable permission to write to the directory (block 136). Different methods may be required for disabling access, depending on the characteristics of the operating system. One way to do this is in Windows NT to change the access control list of the area in memory where the directory is located so that submitters no longer have the authority to write to it. An alternate method for use in UNIX-based systems is illustrated in the flow diagram of FIG. 2B, and discussed below.

Figure 3A:
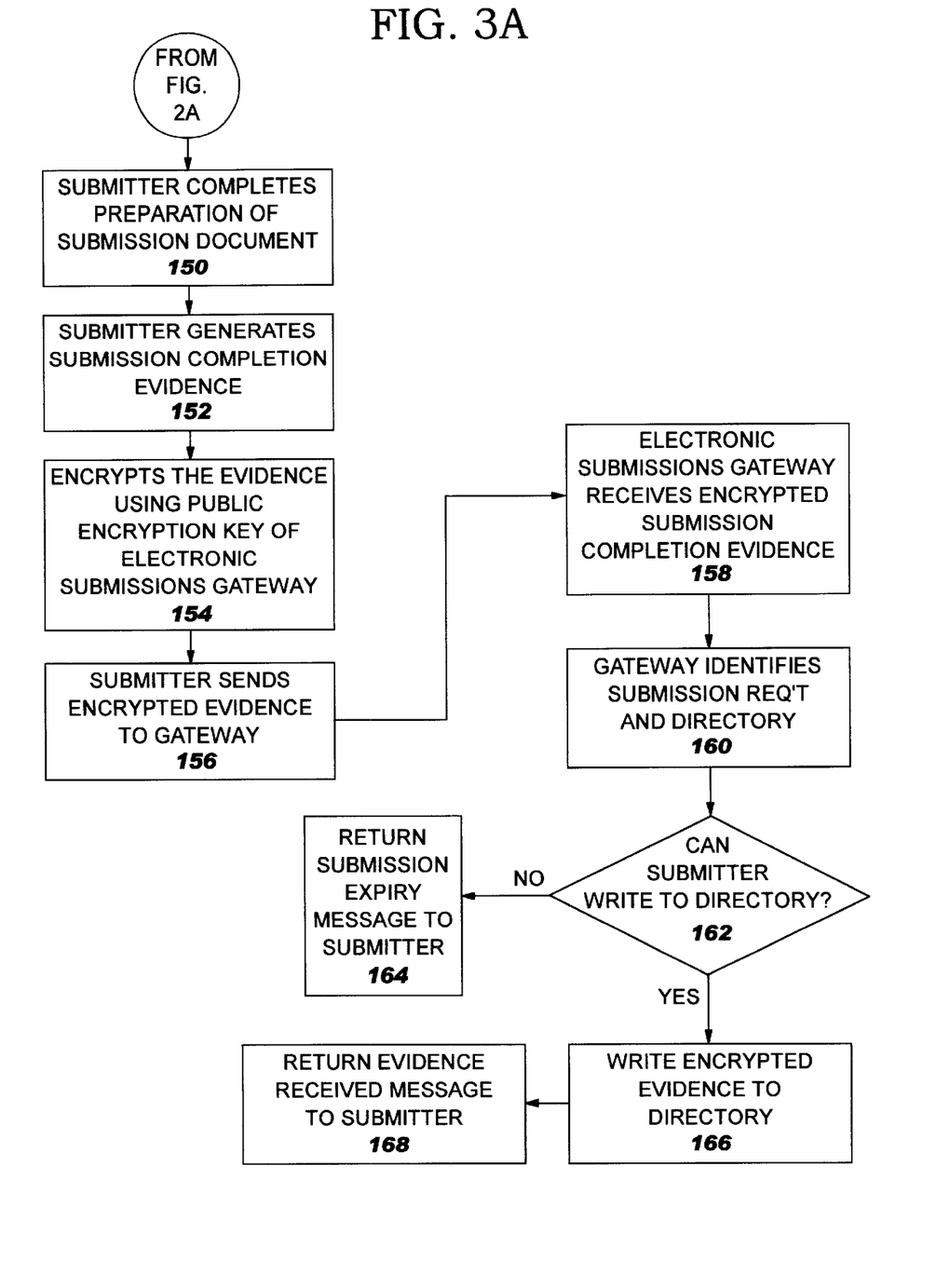
FIGS. 3A and 3B are flow diagrams setting forth alternate methods for submission and verification of submission readiness evidence, according to the invention.
Figure 3B:
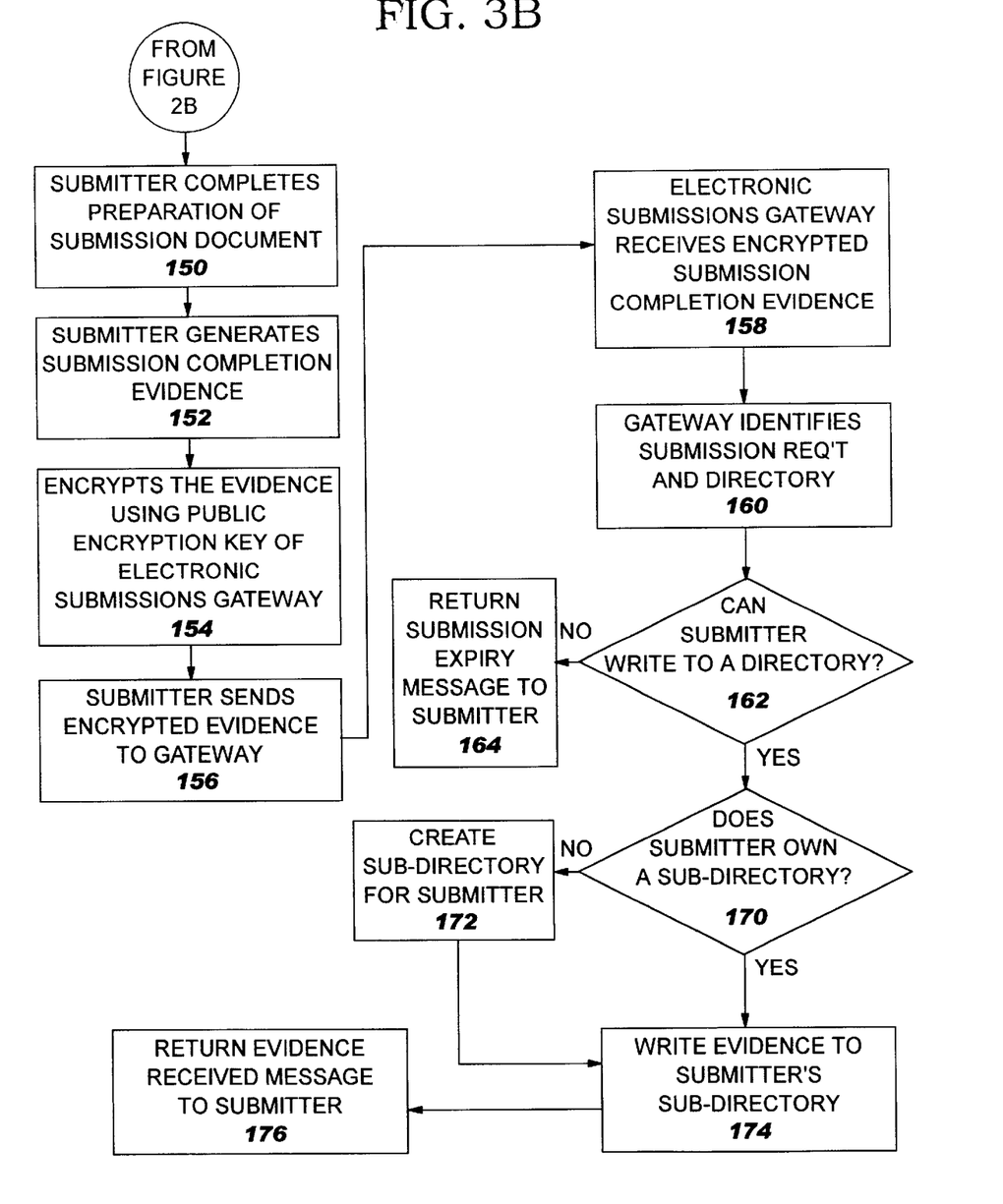

FIG. 3A is a flow diagram illustrating one embodiment of the process followed for a submitter to "lock in" its proposed submission prior to expiry of the deadline set by the Submission Processor that created the requirements.

Once a submitter completes the preparation of a submission (block 150), it generates "evidence" of the completed submission (block 152). The submission completion evidence contains a relatively small amount of data that is quickly transmissible to the Electronic Submissions Gateway, in a form that will make it possible to correlate the evidence with the actual submission. One example of suitable "evidence" is a message digest of the actual submission. Message digest is a one-way hashing function which takes a message of arbitrary length and produces a compressed form called a "digest" or "signature". The "one-way" aspect refers to the fact that it is impossible to obtain the original document from the digest. Message digest is usually based on the conjecture that it is computationally infeasible to produce two different messages having the same message digest (this is referred to as "collision resistance"), or to produce any message having a given pre-specified target message digest.

There are several existing digest functions that are well known. MD2 and MD5 message digest algorithms take as input a message of arbitrary length and produce as output a 128-bit digest of the input. SHA-1 (Secure Hash Algorithm) is based on the published standard, Secure Hash Standard (FIPS 180) of the National Institute of Standards and Technology (NIST). Taking bit strings as its input, the SHA produces a 160-bit message digest of a longer message or file. The message digest is computed using a sophisticated cryptographic algorithm such that any change to the data being hashed will, in a very high probability, change the hash value.

In order to ensure that submitters remain ignorant of the submissions of others, the submitter encrypts the identity of its readiness evidence using the Gateway's public encryption key (block 154), prior to sending the evidence to the Electronic Submissions Gateway (block 156).

All submission readiness evidence for a single requirement arrives in the single directory of the Gateway's file system created for the requirement set (as per block 132 in FIG. 2A and blocks 158 and 160 in FIG. 3A). As mentioned above, some operating systems allow the system administrator to grant access to users to add files to a directory, but not to erase them. When an operating system allows such granularity in access control, it has the added advantage that it automatically provides security in an electronic submission system by preventing submitters from erasing submissions filed by others.

However, the common write-to area of the directory provides an opportunity for submitter fraud in the absence of additional security measures. Specifically, submitters may try to send unauthorised evidence on each other's behalf. To ensure that submission evidence is sent in by the purported submitter and prevent submitters sending in evidence in the name of others, each submitter can be required to include a digital signature with its submission readiness evidence when formulating the message for transmission to the Gateway (block 152).

Since the submission evidence will be used to prove that the submission was indeed completed before expiry of the submission deadline, and corresponds to a submission requirement whose deadline has not expired, the Gateway verifies whether the submitter can write to the directory (block 162). Access to the directory will be denied in the ordinary case where the Gateway has already disabled the submitters' ability to send submission readiness evidence (for example, the Gateway's file system access control has disabled permission to write to this directory, as per block 136 in FIG. 2A), and a message (or other indicator, such as a return code) will be returned to the submitter indicating the filing was not successful (block 164). Access may also be denied if the invitation for submission is limited to a certain group of submitters. (For example, the submission of examination answers may be limited to a particular scholastic class.)

Where the submitter can write to the designated directory (blocks 162, 166), the Gateway returns a message to the submitter indicating that the submission readiness evidence has been successfully filed (block 168), thus providing the submitter with an immediate acknowledgement that the submission deadline has been met.

As mentioned above, UNIX-based systems usually do not allow add-only access to directories. Therefore, access regulation to the directory must be implemented differently. When a submitter wants to make a submission, it creates a sub-directory within the common assigned directory for the requirement set. The sub-directory each submitter creates is "owned" by that submitter. It is only accessible to the submitter that created it and to the administrator of the Gateway server in which it was created; the sub-directory is not accessible to any other submitter. Thus, after the Gateway has identified the submission requirement and directory, and determined whether the submitter can write to the identified directory, following the steps common to FIGS. 3A and 3B, the Gateway determines whether the submitter owns a sub-directory within the directory created for the requirement set (block 170, FIG. 3B). If the sub-directory does not exist, the Gateway allows the submitter to create its sub-directory (block 172). The submitter then writes the submission readiness evidence to the sub-directory it has created (block 174) and returns a message to the submitter indicating that the submission readiness evidence has been successfully filed (block 176).

When the submission deadline expires, permissions of the directory for the given submissions requirements are changed so that no submitters may create new sub-directories. However, in UNIX, a cheating submitter may create its own sub-directory, and write to it even without access to the parent directory in order to file evidence after expiry of the submission deadline. One way to prevent this is for the Gateway file administrator to schedule a job so that on expiry of the submission time limit, not only is access control to the directory changed (for example by remaining the main submissions directory), but the whole content of the directory is copied to another storage location to create a "snapshot" of the directory at the end of the time limit (block 138, FIG. 2B).

Figure 4:
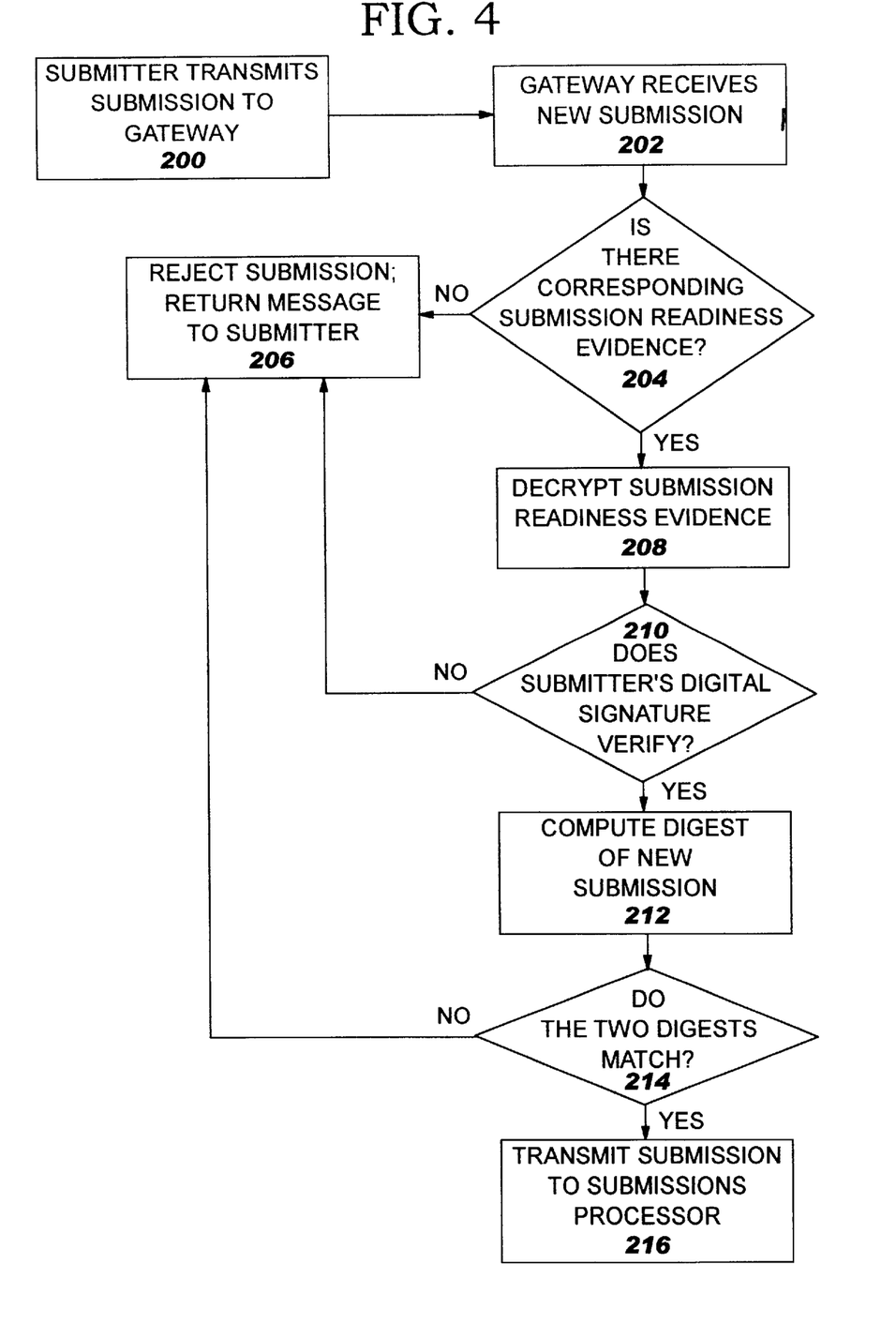
FIG. 4 is a flow diagram setting forth the steps for filing a submission, following completion of the method in either FIG. 3A or 3B.

Referring now to FIG. 4, after the submitter has successfully sent the submission completion evidence, it can now transmit the actual submission to the Gateway (block 200). If the submission is large or if there are network delays, the submission may arrive at the Electronic Submissions Gateway after the submissions deadline has expired. However, this will not prevent the submission being received for filing.

When the Gateway finds a new submission (block 202), it looks for the corresponding submission readiness evidence (block 204). If no such evidence exists, the submission is rejected and a rejection message is returned to the submitter (block 206).

If the submission readiness evidence exists, the Gateway decrypts the stored evidence (block 208) and then verifies the submitter's digital signature on it to prove that the original submission from which the evidence was digested came from the expected submitter (block 210). If it does not, the submission is rejected (block 206).

Once the Gateway verifies the submitter's identity, it verifies that the complete submission corresponds with the submission from which the evidence was created. This is done by computing the digest of the actual submission (block 212), and comparing it against the digest supplied in the evidence message (block 214). If the two digests do not match, then the submission must have been changed from its state before expiry of the submission deadline. The submission is rejected and a rejection message returned to the submitter (block 206).

If the two digests match, the submission is accepted and routed to the correct Submission Processor that created the requirements for the submission (block 216).

Embodiments of the invention that would be obvious to the person skilled in the art are intended to be included within the scope of the appended claims.

The embodiments of the invention in which an exclusive property or privilege is claimed are defined as follows:

1. A method for enforcing time limits in a gateway server in an electronic filing system, comprising steps of:
   receiving, from a submitting program, a first electronic message containing evidence of a completed submission but not containing said completed submission;
   identifying a write-enabled directory for storing said evidence and writing said evidence in the directory, else returning a first submission rejection indication to the submitting program; and
   on receipt of a subsequent message containing the completed submission, computing second evidence from the completed submission and matching the second evidence with the evidence written in the directory, else returning a second submission rejection indication to the submitting program.

2. The method, according to claim 1, wherein the step of matching the second evidence with the evidence written in the directory comprises the step of:
   verifying the submitting program's identity through digital signature.

3. The method, according to claim 1, further comprising steps of:
   receiving a submission requirement including an unexpired submission time limit and generating the directory with write access for submitting programs; and
   removing write access to the directory on expiry of the submission time limit.

4. The method, according to claim 3, wherein the step of removing write access to the directory comprises changing access policy for the directory.

5. The method, according to claim 4, wherein the step of removing write access to the directory comprises changing access policy for the directory and, immediately after expiry of the submission time limit, copying all messages stored in the directory to another storage area.

6. A method for enforcing time limits in a gateway server in an electronic filing system, comprising steps of:
   receiving, from a submitting program, a first electronic message containing a first message digest of a completed submission but not containing said completed submission;
   identifying a write-enabled directory for storing said first message digest and writing said first message digest in the directory, else returning a first submission rejection indication to the submitting program; and
   on receipt of a subsequent electronic message containing the completed submission, computing a second message digest of the completed submission, and matching the second message digest with the first message digest written in the directory, else returning a second submission rejection indication to the submitting program.

7. The method, according to claim 6, further comprising steps of:
   receiving a submission requirement including an unexpired submission time limit and generating the directory with write access for submitting programs; and
   removing write access to the directory on expiry of the submission time limit.

8. The method, according to claim 7, wherein the step of removing write access to the directory comprises changing access policy for the directory.

9. The method, according to claim 7, wherein the step of removing write access to the directory comprises changing access policy for the directory and, immediately after expiry of the submission time limit, copying all messages stored in the directory to another storage area.

10. In a network, a gateway mechanism for enforcing time limits for filing electronic submissions, comprising:
   means in a server in the gateway mechanism for receiving information related to a submission time limit from a submission processing environment and for generating a storage directory in the server's file system with write access for all potential submitters within the submission time limit;
   means for
      (i) receiving, from a submitter, a first electronic message containing evidence of a completed submission but not containing said completed submission,
      (ii) verifying write access to the storage directory, and
      (iii) if the write access is verified, writing the evidence to the storage directory, else returning an error indication to the submitter;
   means for removing the write access to the storage directory on expiry of the submission time limit;

means for computing second evidence from the completed submission upon receiving said completed submission from the submitter in a subsequent electronic message; and means for matching the second evidence with the evidence written to the storage directory, else returning an error indication to the submitter.

11. The mechanism, according to claim 10, wherein the means for receiving information related to a time limit from a submission processing environment comprises:

a submission repository adapted to receive information related to current submission requirements from the submission processing environment; and means to poll the submission repository to update the submission time limit.

12. The mechanism, according to claim 10, wherein the means for removing write access to the storage directory comprises means for changing access policy for the storage directory.

13. The mechanism, according to claim 10, wherein the means for removing write access to the storage directory comprises means for changing access policy for the storage directory and means for creating a copy in another storage location of the storage directory as the time limit expires.

14. The mechanism, according to claim 10, wherein the means for matching the second evidence with the evidence written to the storage directory comprises verifying the submitter's identity by digital signature.

15. The mechanism, according to claim 10, wherein:

the evidence comprises a message digest of the completed submission;

the means for computing second evidence from the completed submission comprise means at the server for computing a second message digest from the received completed submission; and the means for matching the second evidence with the evidence written to the storage directory comprise means at the server for comparing the second evidence to the evidence written to the storage directory; and further comprising means for routing the completed submission to the submission processing environment if the means for comparing determines that the second evidence and the evidence written to the storage directory are identical.

16. The mechanism, according to claim 10, wherein the evidence comprises a message digest of the completed submission computed by the submitter, and wherein the means for computing second evidence from the completed submission comprises means at the server to compute a new message digest of the completed submission.

17. A computer program product comprising a computer usable medium having computer readable program code means embodied thereon for enforcing time limits in an electronic filing system, the computer readable program product comprising:

computer readable program code means for causing a computer to receive, from a submitting program, a first electronic message containing evidence of a completed submission but not containing said completed submission;

computer readable program code means for causing the computer to identify a write-enabled directory for storing said evidence and to write said evidence in the directory, else return a first submission rejection indication to the submitting program; and computer readable program code means, on receipt of a subsequent electronic message containing the completed submission, for causing the computer to compute second evidence from the completed submission and to match the second evidence with the evidence written in the directory, else return a second submission rejection indication to the submitting program.

18. A computer program product comprising a computer usable medium having computer readable program code means embodied thereon for enforcing time limits in an electronic filing system, the computer readable program product comprising:

computer readable program code means for causing a computer to receive, from a submitting program, a first electronic message containing a first message digest of a completed submission, wherein said first electronic message does not contain said completed submission;

computer readable program code means for causing the computer to identify a write-enabled directory for storing said first message digest and to write said first message digest in the directory, else return a first submission rejection message to the submitting program; and computer readable program code means, on receipt of a subsequent message containing the completed submission, for causing the computer to compute a new message digest of the completed submission and to match the new message digest with the first message digest written in the directory, else return a second submission rejection message to the submitting program.

* * * * *